United States Patent
Blauvelt et al.

(10) Patent No.: US 7,184,643 B2
(45) Date of Patent: Feb. 27, 2007

(54) MULTIPLE-CORE PLANAR OPTICAL WAVEGUIDES AND METHODS OF FABRICATION AND USE THEREOF

(75) Inventors: Henry A. Blauvelt, San Marino, CA (US); David W. Vernooy, Sierra Madre, CA (US); Joel S. Paslaski, Alhambra, CA (US)

(73) Assignee: Xponent Photonics Inc, Monrovia, CA (US)

( * ) Notice: Subject to any disclaimer, the term of this patent is extended or adjusted under 35 U.S.C. 154(b) by 144 days.

(21) Appl. No.: 10/836,641

(22) Filed: Apr. 29, 2004

(65) Prior Publication Data
US 2004/0264905 A1 Dec. 30, 2004

Related U.S. Application Data

(60) Provisional application No. 60/466,799, filed on Apr. 29, 2003.

(51) Int. Cl.
*G02B 6/10* (2006.01)
*G02B 6/26* (2006.01)

(52) U.S. Cl. .................. 385/131; 385/129; 385/30; 385/43; 385/50

(58) Field of Classification Search .............. None
See application file for complete search history.

(56) References Cited

U.S. PATENT DOCUMENTS

| | | | |
|---|---|---|---|
| 5,119,460 A * | 6/1992 | Bruce et al. ............. | 385/142 |
| 5,159,699 A | 10/1992 | de Monts | |
| 6,034,983 A | 3/2000 | Fujii et al. | |
| 6,330,378 B1 | 12/2001 | Forrest et al. | |
| 6,385,376 B1 | 5/2002 | Bowers et al. | |
| 6,483,863 B2 | 11/2002 | Forrest et al. | |
| 6,600,847 B2 | 7/2003 | Saini et al. | |
| 6,744,953 B2 | 6/2004 | Lemoff et al. | |
| 6,870,992 B2 | 3/2005 | Hunziker et al. | |
| 6,884,327 B2 * | 4/2005 | Pan et al. ............. | 204/192.12 |
| 7,095,920 B1 * | 8/2006 | Little ............. | 385/30 |
| 2002/0037141 A1 | 3/2002 | Miyamoto et al. | |
| 2003/0039439 A1 | 2/2003 | Deliwala | |
| 2003/0081902 A1 | 5/2003 | Blauvelt et al. | |
| 2003/0235371 A1 | 12/2003 | Shimada et al. | |

(Continued)

OTHER PUBLICATIONS

U.S. Appl. No. 11/058,535, Blauvelt et al.

(Continued)

*Primary Examiner*—Rodney Bovernick
*Assistant Examiner*—Omar Rojas
(74) *Attorney, Agent, or Firm*—David S. Alavi; Christie Parker & Hale LLP

(57) ABSTRACT

A multiple-core planar optical waveguide comprises: a substantially planar waveguide substrate; a lower waveguide core; an upper waveguide core; lower cladding between the substrate and the lower waveguide core; and upper cladding above the upper waveguide core. At least a portion the upper waveguide core is positioned above and substantially parallel to at least a portion of the lower waveguide core. The lower and upper claddings have refractive indices less than refractive indices of the lower and upper waveguide cores. The width of the lower waveguide core is substantially larger than its thickness along at least a portion of its length, and is substantially flat along that portion of its length, thereby yielding a substantially flat surface for forming at least a portion of the upper waveguide core.

3 Claims, 10 Drawing Sheets

U.S. PATENT DOCUMENTS

2004/0013384 A1* 1/2004 Parker et al. ............ 385/129
2004/0052467 A1 3/2004 Blauvelt et al.
2004/0052480 A1 3/2004 Benzoni et al.
2004/0218849 A1 11/2004 Blauvelt et al.

OTHER PUBLICATIONS

International Search Report and Written Opinion for PCT App. No. PCT/US2004/013290.

Hilleringmann et al, Optoelectronic System Integration on Silicon:Waveguides, Photodetectors, and VLSI CMOS Circuits on One Chip, IEEE Transactions on Electron Devices, May 1995, pp. 841-846, vol. 42, No. 5.

Hoffman et al, Low-Loss Fiber-Matched Low-Temperature PECVD Waveguides with Small-Core Dimensions for Optical Communications Systems, IEEE Photonics Technology Letters, Sep. 1997, pp. 1238-1240, vol. 9, No. 9.

Horst et al, Compact, Tunable Optical Devices in Silicon-Oxynitride Waveguide Technology, Proc. Topical Meeting on Integrated Photonics Research, IPR 2000, 1999, Published in: Quebec Canada.

Kimerling, Photons to the Rescue: Microelectronics Becomes Microphotonics, Interface, Jun. 2000, pp. 28-31, vol. Summer 2000, Publisher: The Electrochemical Society.

Liu et al, Fused InP-GaAs Vertical Coupler Filters, IEEE Photonics Technology Letters, Jan. 1999, pp. 93-95, vol. 11, No. 1.

Li et al, Silicon Optical Bench Waveguide Technology, Optical Fiber Telecommunications, 1997, pp. 319-376, vol. IIIB, Publisher: Academic Press, Published in: US.

Li et al, Silica-based optical integrated circuits, IEE Proc.-Optoelectron., Oct. 1996, pp. 263-280, vol. 143, No. 5.

Offrein et al, Resonant Coupler-Based Tunable Add-After-Drop Filter in Silicon-Oxynitride Technology for WDM Networks, IEEE Journal of Selected Topics in Quantum Electronics,-Sep. 1999, pp. 1400-1406, vol. 5, No. 5.

De Ridder et al, Silicon Oxynitride Planar Waveguiding Structure for Application in Optical Communication, IEEE Journal of Selected Topics in Quantum Electronics, Nov. 1998, pp. 930-937, vol. 4, No. 6.

Shani et al, Efficient coupling of a semiconductor laser to an otpical fiber by means of a tapered waveguide on silicon, Applied Physics Letters, Dec. 4, 1998, pp. 2389-2391, vol. 55, No. 23.

* cited by examiner

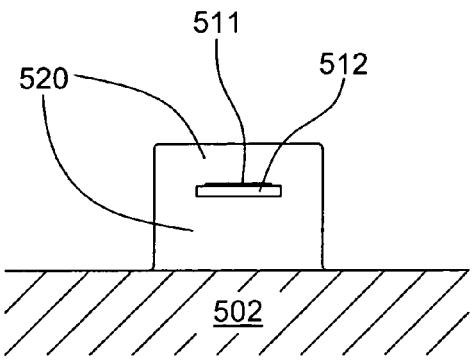
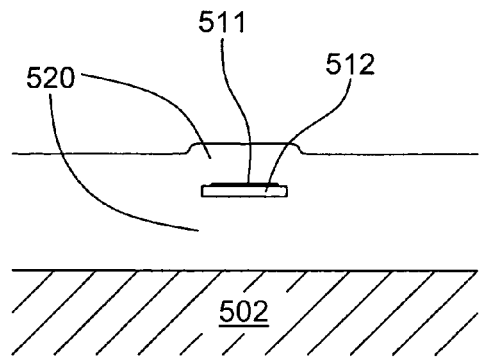
FIG. 5A    FIG. 5B
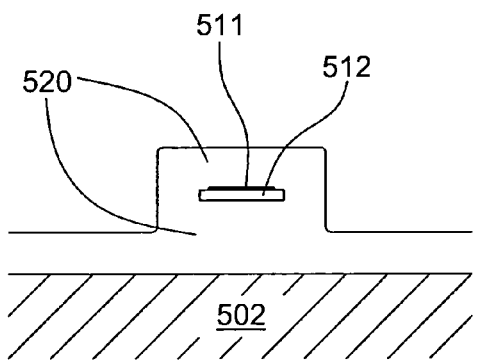
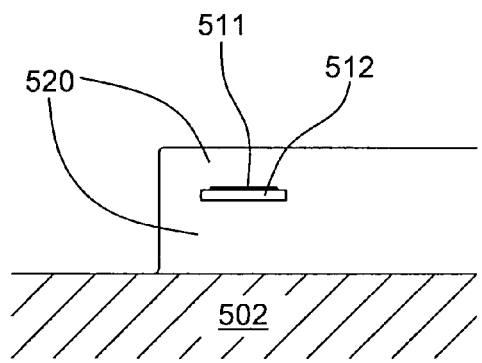
FIG. 5C    FIG. 5D
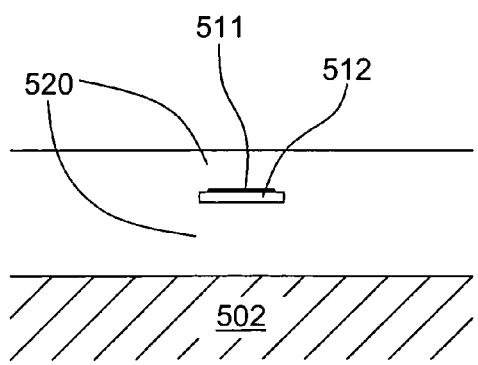
FIG. 5E

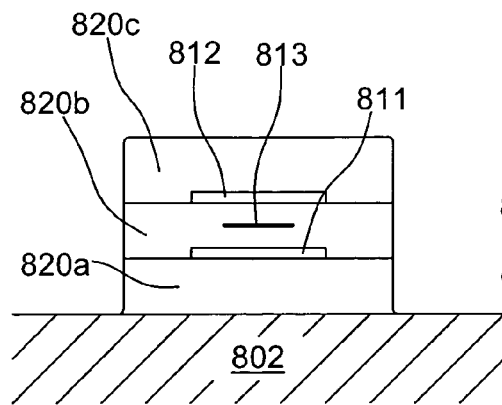
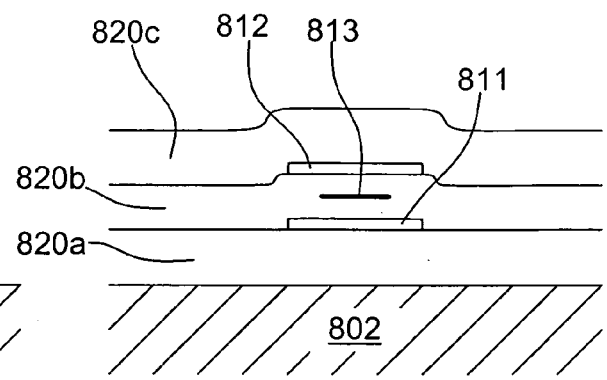
FIG. 8A    FIG. 8B
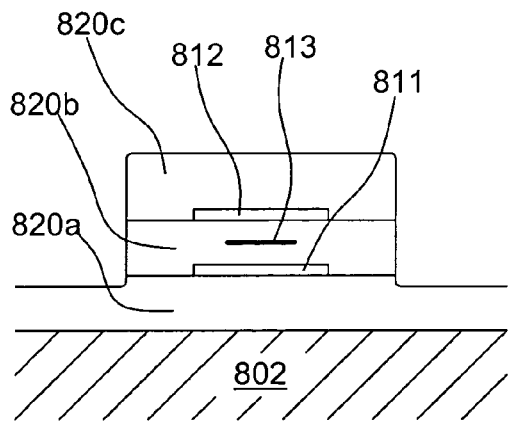
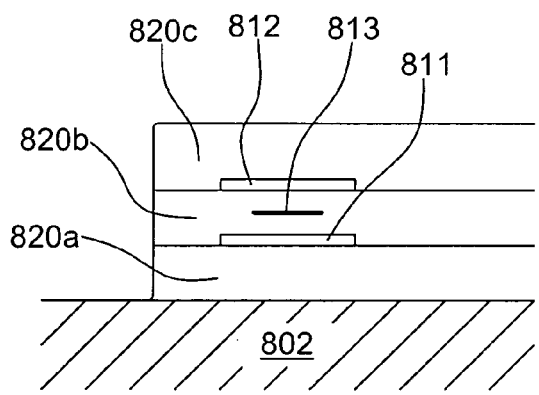
FIG. 8C    FIG. 8D
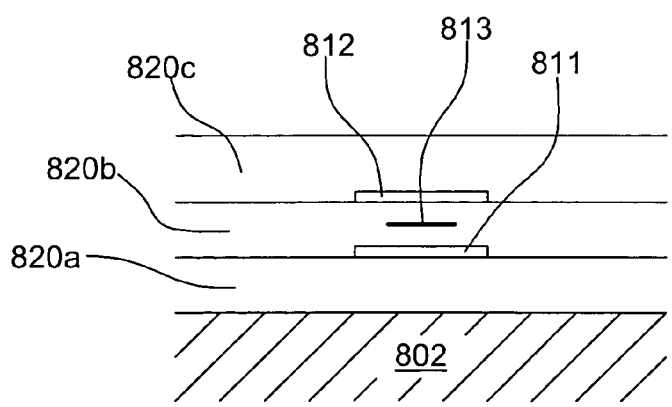
FIG. 8E

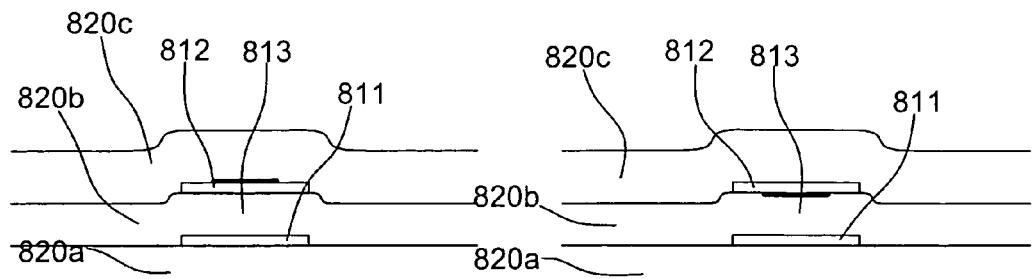
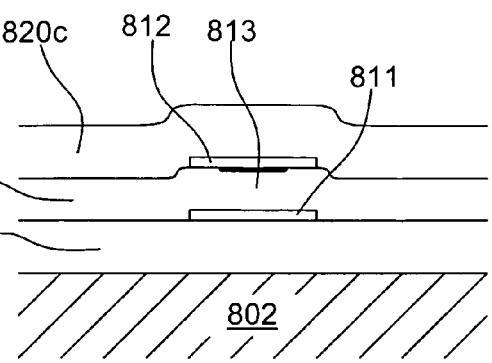
FIG. 10A
FIG. 10B
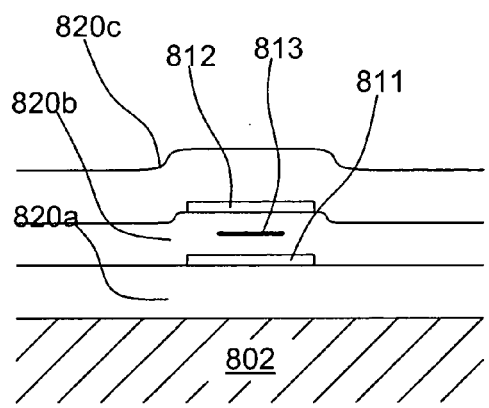
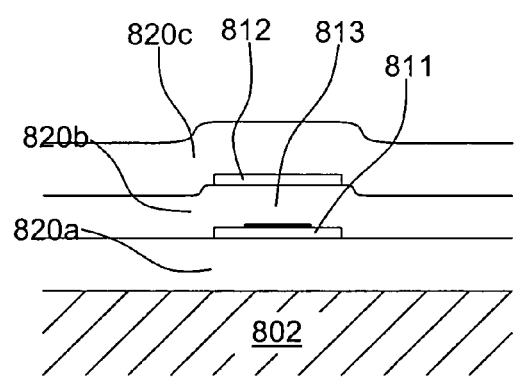
FIG. 10C
FIG. 10D
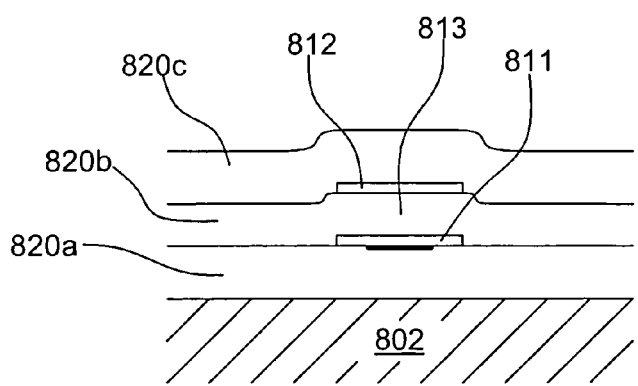
FIG. 10E

MULTIPLE-CORE PLANAR OPTICAL WAVEGUIDES AND METHODS OF FABRICATION AND USE THEREOF

RELATED APPLICATIONS

This application claims benefit of U.S. provisional App. No. 60/466,799 entitled "Low-profile-core and thin-core optical waveguides and methods of fabrication and use thereof" filed Apr. 29, 2003 in the names of David W. Vernooy, Joel S. Paslaski, and Guido Hunziker, said provisional application being hereby incorporated by reference as if fully set forth herein.

BACKGROUND

The field of the present invention relates to optical waveguides. In particular, multiple-core planar optical waveguides are disclosed herein, as well as methods of fabrication and use thereof.

This application is related to U.S. non-provisional application Ser. No. 10/609,018 entitled "Waveguides assembled for transverse-transfer of optical power" filed Jun. 27, 2000 in the names of Henry A. Blauvelt, David W. Vernooy, Joel S. Paslaski, and Guido Hunziker (U.S. Pat. App. Pub. No. 2004/0052467 A1 published Mar. 18, 2004), said non-provisional application being hereby incorporated by reference as if fully set forth herein.

Planar optical waveguides fabricated on waveguide substrates may be incorporated into a variety of optical assemblies. Such optical waveguides may be fabricated with mulitple cores. The use of such multiple-core planar optical waveguides may be advantageous in a variety of ways, as set forth hereinbelow.

SUMMARY

A multiple-core planar optical waveguide comprises: a substantially planar waveguide substrate; a lower waveguide core; an upper waveguide core; lower cladding between the substrate and the lower waveguide core; and upper cladding above the upper waveguide core. At least a portion the upper waveguide core is positioned above and substantially parallel to at least a portion of the lower waveguide core. The lower and upper claddings have refractive indices less than refractive indices of the lower and upper waveguide cores. The width of the lower waveguide core is substantially larger than its thickness along at least a portion of its length, and is substantially flat along that portion of its length, thereby yielding a substantially flat surface for forming at least a portion of the upper waveguide core.

The lower and upper waveguide cores may include two low-index-contrast waveguide cores, two high-index-contrast waveguide cores, or one of each. The optical waveguide may include a spacer layer (equivalently, middle cladding layer) between the lower and upper waveguide cores, and may include a third waveguide core. The waveguide cores may taper in various ways so as to effect mode conversions by optical coupling between the waveguide cores. The waveguide may terminate at an end face thereof for optical end-coupling with a planar waveguide or optical fiber.

The multiple-core planar optical waveguide may be fabricated by: forming the lower cladding layer; forming the lower waveguide core; forming the upper waveguide core; and forming the upper cladding. Fabrication may further include forming the middle cladding and/or the third waveguide core. Spatial patterning of various waveguide cores may be done sequentially or concurrently.

Objects and advantages pertaining to dual-core planar optical waveguides as disclosed herein may become apparent upon referring to the disclosed exemplary embodiments as illustrated in the drawings and disclosed in the following written description and/or claims.

BRIEF DESCRIPTION OF THE DRAWINGS

FIGS. 5A–5E are cross-sectional views of exemplary low-profile-dual-core optical waveguides.

FIGS. 8A–8E are cross-sectional views of exemplary low-profile-multiple-core optical waveguides.

FIGS. 10A–10E are cross-sectional views of exemplary low-profile-multiple-core optical waveguides.

Figure 1A:
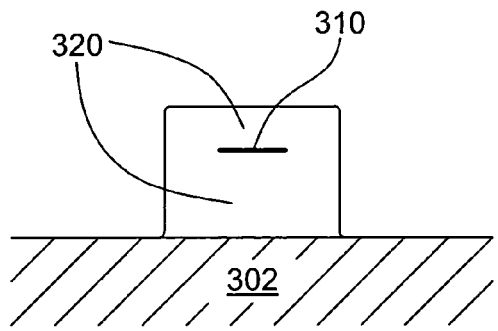
FIGS. 1A–1E are cross-sectional views of exemplary low-profile-core optical waveguides.
Figure 1B:
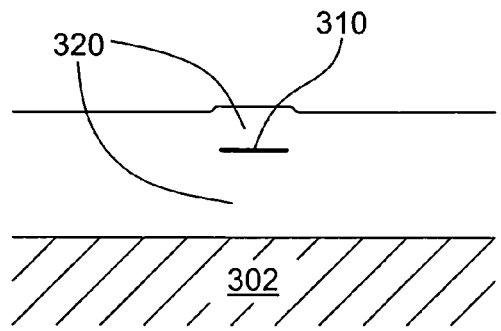
Figure 1C:
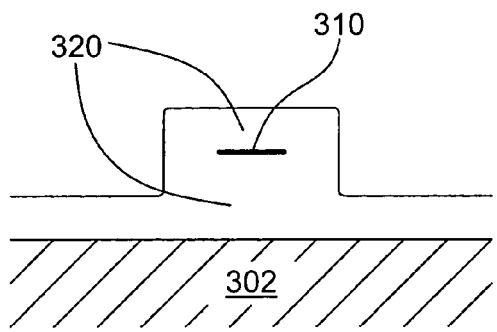
Figure 1D:
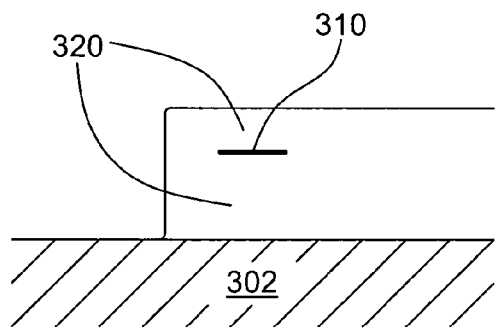
Figure 1E:
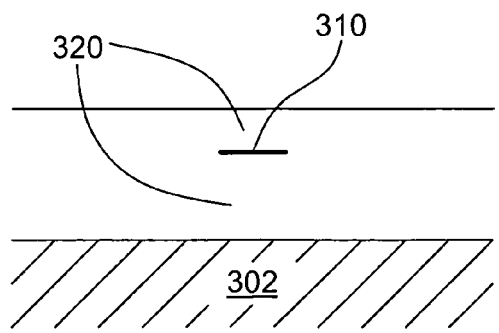
Figure 2A:
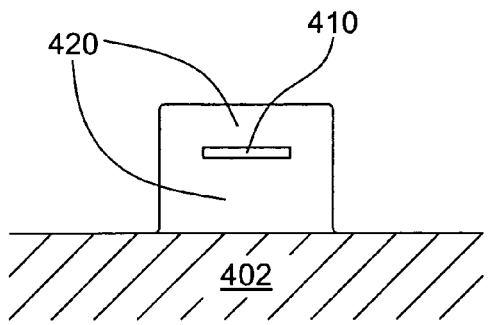
FIGS. 2A–2E are cross-sectional views of exemplary low-profile-core optical waveguides.
Figure 2B:
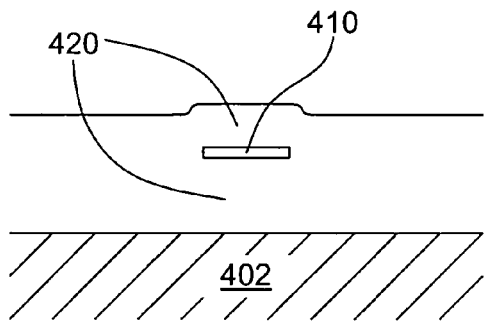
Figure 2C:
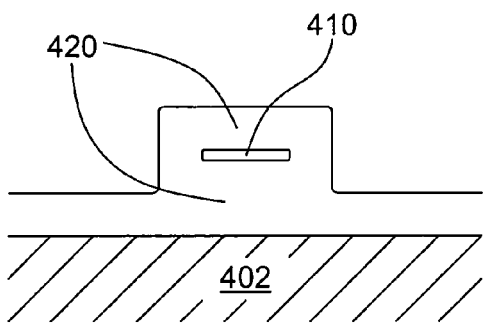
Figure 2D:
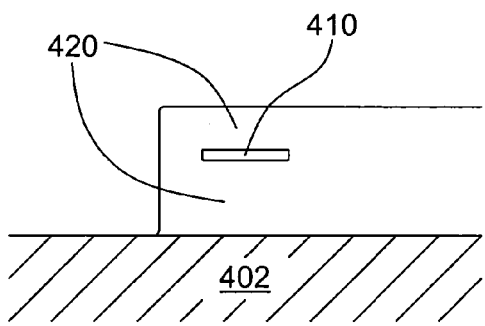
Figure 2E:
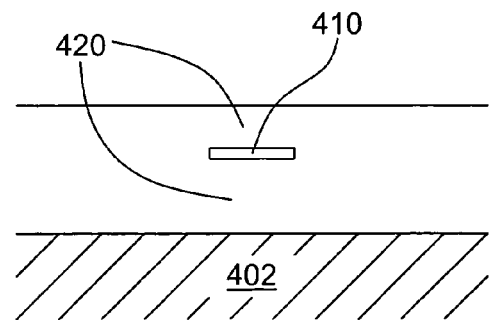
Figure 3A:
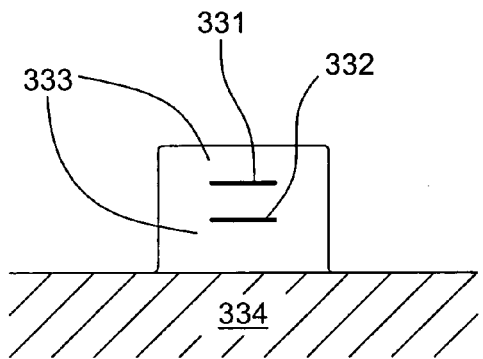
FIGS. 3A–3E are cross-sectional views of exemplary low-profile-dual-core optical waveguides.
Figure 3B:
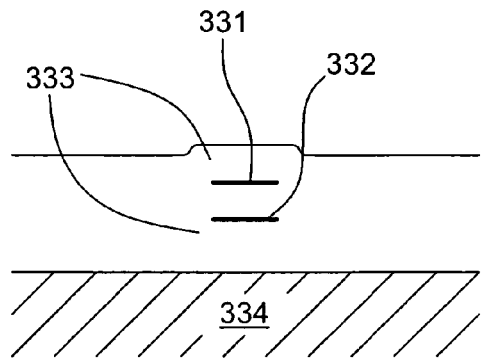
Figure 3C:
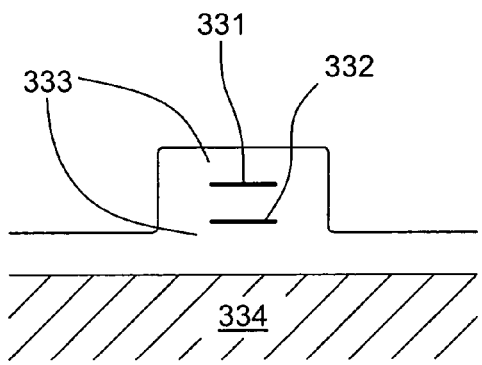
Figure 3D:
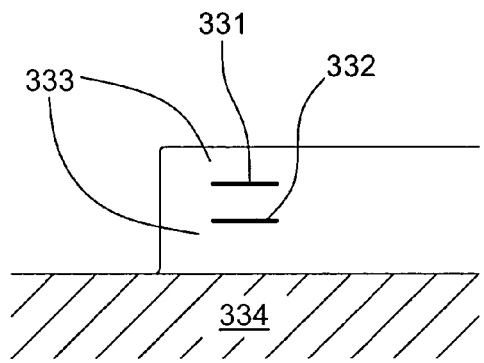
Figure 3E:
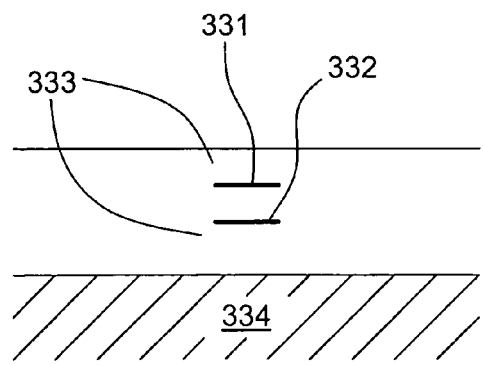
Figure 4A:
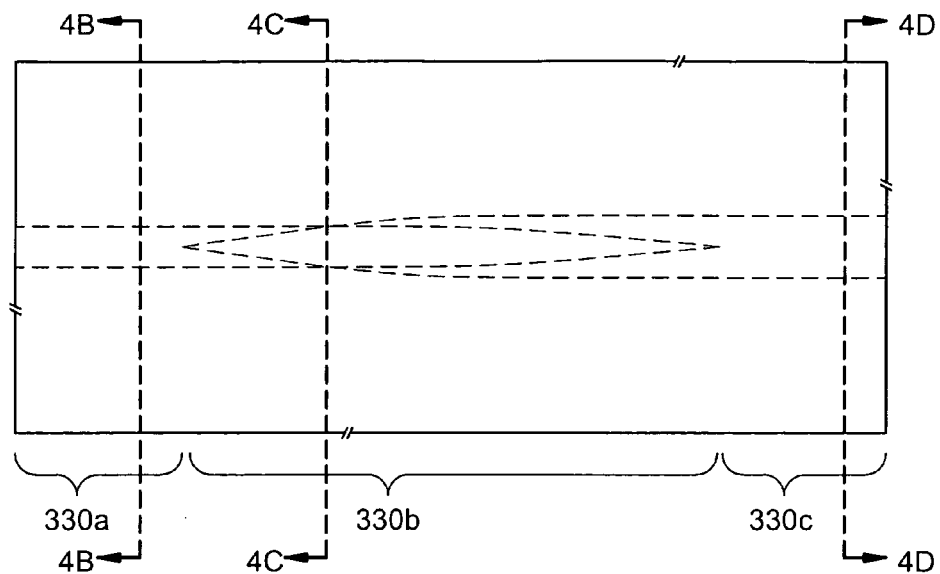
FIGS. 4A–4D are plan and cross-sectional views of an exemplary low-profile-dual-core optical waveguide.
Figure 4B:
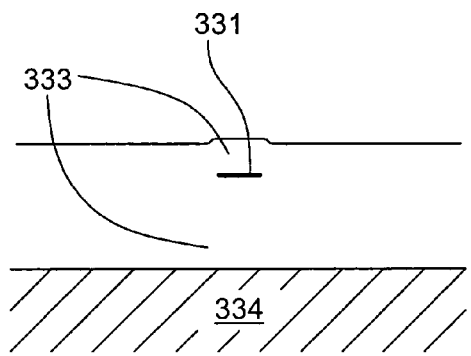
Figure 4C:
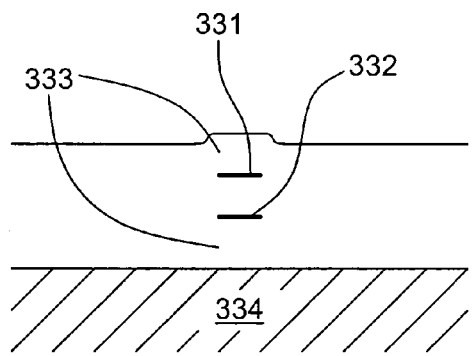
Figure 4D:
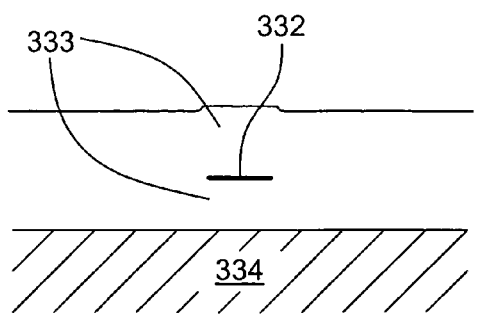

The embodiments shown in the Figures are exemplary, and should not be construed as limiting the scope of the present disclosure and/or appended claims. It should be noted that the relative sizes and/or proportions of structures shown in the Figures may in some instances be distorted to facilitate illustration of the disclosed embodiments.

DETAILED DESCRIPTION OF EMBODIMENTS

The term "low-profile core" as used herein shall primarily designate a core of a planar waveguide in which the vertical dimension (i.e., the dimension substantially perpendicular to the waveguide substrate) is sufficiently small relative to the horizontal dimension (equivalently, the lateral dimension; i.e., the dimension substantially parallel to the waveguide substrate) so as to enable formation of substantially flat upper cladding surfaces upon formation of an upper cladding layer over the low-profile core. Such substantially flat upper cladding surfaces may be utilized as mechanical alignment and/or support structures, may provide optical transverse-coupling surfaces for mating with similar surfaces of other waveguides, or may provide a surface suitable for formation of an additional core on the upper cladding surface (which would typically be covered by additional cladding material). Low-profile waveguide cores for supporting optical modes at typical telecommunications wavelengths (visible and near infrared; modes typically several microns in transverse extent) are typically less than about 3 µm thick, may be less than 1.5 µm thick, and may be less than about 0.5 µm thick. In more extreme examples, low-profile cores may be only tens or a few hundreds of nanometers thick. The aspect ratio (horizontal:vertical) of such a low-profile core is usually greater than about 2:1, may be greater than about 5:1, may be greater than about 10:1, or may be as large as or larger than 50:1 or 100:1 in some cases.

The term "thin core" may be used herein to designate a waveguide core sufficiently thin, regardless of aspect ratio, so as to mitigate difficulties encountered when fabricating and/or processing thicker cores. Such difficulties, described further hereinbelow, may include but are not limited to: i) difficulties associated with formation of structures having lateral dimensions significantly smaller than the thickness of the corresponding layer; ii) difficulties associated with deposition of material to fill gaps significantly deeper than their widths; iii) difficulties associated with maintaining continuity of metal electrical traces across surfaces having deep (greater than 2–3 µm ) topographical features; and so on. Core thicknesses less than about 3 µm thick, less than about 1.5 µm thick, or less than about 0.5 µm thick, are often found to mitigate such fabrication difficulties, and will therefore be considered "thin cores" for the purposes of the present disclosure. While "low-profile cores" as defined hereinabove shall typically fall within the definition of "thin core", the reverse is not necessarily true: a "thin core" may not exhibit an aspect ratio falling within the definition of "low-profile core".

FIGS. 1A–1E show cross sections of exemplary embodiments of a planar optical waveguide including a low-profile core 310. The waveguide is formed on a waveguide substrate 302, typically a substantially planar semiconductor substrate such as silicon. Any suitable waveguide substrate material may be employed, including those listed hereinabove and equivalents thereof. Core 310 is surrounded by lower-index cladding 320. In the examples of FIGS. 1A–1E, the waveguide core 310 may comprise a thin layer of silicon nitride ($Si_xN_y$; index of about 2) or silicon oxynitride ($SiN_xO_y$; index between about 1.5 and about 2) typically ranging between a few tens and a few hundreds of nanometers in thickness. Cladding 320 in this example may comprise silica or doped silica (index around 1.45–1.5). Other suitable core and cladding materials may be equivalently employed. Waveguides having core/cladding index contrast of greater than about 5% shall be referred to herein as high-index-contrast waveguides, while waveguides having core/cladding index contrast less than about 5% shall be referred to herein as low-index-contrast waveguides. For supporting optical modes at typical telecommunications wavelengths (visible and near-infrared), core 310 of the exemplary high-index-contrast waveguide 300 may range between about 0.5 µm and about 8 µm in width. The particular thickness and width chosen depend on the desired characteristics of waveguide 300 (described further hereinbelow). A silicon nitride core around 50–100 nm thick by about 2–3 µm wide (yielding a transverse mode size of around 1–2 µm high by around 1.5–2 µm wide; mode sizes expressed as $1/e^2$ HW power) might be well-suited for spatial-mode-matching with a semiconductor optical device mode, while a silicon nitride core around 5–6 µm wide may be well-suited for spatial-mode-matching with larger optical modes, or for facilitating optical transverse-coupling with another waveguide.

The cladding 320 between substrate 302 and core 310 may be made sufficiently thick so as to reduce or substantially prevent leakage of optical power from waveguide 300 into substrate 302 (within operationally acceptable limits). A lower cladding thickness greater than about 5 µm, typically greater than about 10 µm, may adequately serve this purpose. Alternatively, a reflective coating (not shown) may be deposited on substrate 302 before deposition of the lower cladding and the core. Such a reflective coating (metal, dielectric, multi-layer, or otherwise) may serve to reduce or substantially prevent optical leakage from waveguide 300 into substrate 302 (within operationally acceptable limits), while enabling use of a thinner lower cladding layer.

The thickness of cladding 320 above core 310 may vary, depending on the intended use of the waveguide. The upper cladding may be made sufficiently thick so as to reduce or substantially prevent optical leakage through the upper surface of the waveguide (within operationally acceptable limits), and/or to substantially isolate a supported optical mode from a use environment (within operationally acceptable limits). An upper cladding thickness greater than about 5 µm, typically greater than about 10 µm, may adequately serve this purpose. Alternatively, a thinner upper cladding layer may be adequate or desirable in other circumstances. For example, the waveguide may be used for optical transverse-coupling with another optical waveguide, in which case the upper cladding may be less than about 1 µm in thickness. Such a thin upper cladding layer allows spatial overlap of the optical modes of the transverse-coupled waveguides. In another example, a thin upper cladding layer may be adequate in cases where the waveguide is subsequently embedded or encapsulated in a transparent optical medium having an index less than or about equal to the cladding index. In effect, the embedding medium acts as additional cladding. Depending on the physical and/or mechanical constraints and/or requirements imposed on the waveguide, the cladding 320 may extend laterally away from the core 310 so as to substantially eliminate any effect of any lateral waveguide edge on an optical mode supported by core 310 (as in FIGS. 1B and 1E). Alternatively, cladding 320 may be formed so as to yield a protruding lateral surface on one or both sides of core 310 (as in FIGS. 1A, 1C, and 1D), and such surface(s) may or may not influence the characteristics of a supported optical mode. Such lateral surfaces may be provided at varying depths, and may or may not extend downward near or beyond the depth of core 310. A waveguide may be formed to include multiple segments having various of these configurations.

Additional exemplary embodiments of a planar waveguide are shown in cross-section in FIGS. 2A–2E positioned on a waveguide substrate 402. Substrate 402 may comprise a semiconductor substrate such as silicon in this example, although any suitable substrate material may be employed. In this example the waveguide may include a doped silica core 410 within lower-index cladding 420, which may comprise doped or undoped silica. The index contrast is typically much smaller than in the examples of FIGS. 1A–1E. The index contrast between core 410 and cladding 420 may be less than about 1 or 2%, for example (low-index-contrast). The core may be about 0.5 µm thick by about 5 µm wide in this example, yielding a transverse mode size of around 4–5 µm high by around 4–5 µm wide (mode sizes expressed as $1/e^2$ HW power). Such a mode might be well-suited for spatial-mode-matching with an optical fiber mode, for example. A low-profile, low-index-contrast waveguide core may range from about 0.3 µm thick up to about 2–3 µm thick, and between about 1 µm and about 10 µm wide. Specific combinations of dimensions will depend on the desired spatial mode characteristics and the particular degree of index contrast employed. In addition to doped and undoped silica, other suitable core and cladding materials may be equivalently employed. As in the previous example, cladding 420 below core 410 may be sufficiently thick so as to reduce or substantially eliminate optical leakage from waveguide 400 into substrate 402 (within operationally acceptable limits), or a reflective coating between the cladding and the substrate may be employed (as described hereinabove). Lateral portions of cladding 420 may be configured in any of the various ways described hereinabove, and waveguide 400 may be formed to include multiple segments having various of these configurations.

Exemplary embodiments of a dual-core planar waveguide are shown in FIGS. 3A–3E positioned on waveguide substrate 334. As in the preceding examples, substrate 334 may comprise silicon, although any suitable substrate material may be employed, and cladding 333 comprises doped or undoped silica of suitable thickness above and below the waveguide cores, although any suitable cladding material may be employed. In this example the waveguide includes two distinct low-profile core layers 331 and 332, each comprising a layer of silicon nitride or silicon oxynitride a few tens to a few hundreds of nanometers in thickness, and several microns in width. Each of core layers 331 and 332 may extend along only a portion of the waveguide while being absent from another portion. Lateral portions of cladding 333 may be configured in any of the various ways described hereinabove, and the waveguide may be formed to include multiple segments having various of these configurations.

The two-layer structure of the core of the waveguide of FIGS. 3A–3E enables an array of optical designs for achieving various optical performance and/or functionality, by enabling transfer of optical power (by optical transverse-coupling) between the waveguide cores. As shown in FIGS. 4A–4D, waveguide cores 331 and 332 may each be patterned within cladding 333. Along a first waveguide segment 330a, the core 331 alone determines the characteristics and position of a guided optical mode, while along an opposite waveguide segment 330c core 332 alone determines the characteristics and position of the guided optical mode. Cores 331 and 332 may be substantially identical (except for depth within cladding 333) or may differ in width, thickness, and/or index. Along an intermediate waveguide segment 330b both cores are present, shown tapering in width in opposite directions. This tapering may be sufficiently gradual so as to yield substantially adiabatic transfer of optical power from one core to the other (i.e., to substantially avoid, within operationally acceptable limits, optical coupling to unwanted optical modes, which may include guided modes and/or radiation modes). Alternatively, one or both of the cores may appear abruptly (not shown) at the respective ends of waveguide segment 330b, and the cores configured for mode-interference-coupled optical transverse-coupling. The exemplary optical waveguide as shown in FIGS. 4A–4D may therefore serve as an optical mode converter, with optical power propagating in either direction. The mode conversion may include transformation of both mode position (i.e., depth within cladding 333) and transverse mode size and/or shape, or may only involve the mode position. An optical waveguide structure such as that shown in FIGS. 4A–4D may be employed for transforming the transverse spatial-mode profile, shifting the optical mode away from the cladding surface, altering modal index, and/or for other purposes Cores 331 and 332 may each be configured for supporting an optical mode having certain desired characteristics. For example, core 331 (the shallower of the two core layers) may be readily adapted for substantially spatial-mode-matched optical end coupling with another optical waveguide or semiconductor optical device, or for optical transverse-coupling with another optical waveguide (substantially adiabatic, substantially modal-index-matched, or otherwise), or for other purposes. For example, core 332 may be readily adapted for substantially spatial-mode-matched optical end-coupling with another optical waveguide or with an optical fiber, or for enabling insertion of various free-space optical components between the ends of two such optical waveguides, or for other purposes. The low-profile nature of the waveguide cores 331 and 332 (particularly core 332, the deeper of the two) facilitates formation of core 331 during later fabrication steps.

Additional exemplary embodiments of a planar waveguide are shown in FIGS. 5A–5E positioned on waveguide substrate 502. As in the preceding examples, substrate 502 may comprise silicon, although any suitable substrate material may be employed, and cladding 520 comprises doped or undoped silica of suitable thickness above and below the waveguide core, although any suitable cladding material may be employed. In this example the waveguide core comprises two distinct core layers 511 and 512. Core layer 511 may comprise a layer of silicon nitride or silicon oxynitride a few tens to a few hundreds of nanometers in thickness, and several microns in width (high-index-contrast). Core layer 511 may extend along the entire waveguide, or may extend along only one or more segments of the waveguide while being absent from other segments. Core layer 512 may comprise a layer of doped silica about 0.5 µm thick having an index slightly higher than cladding 520 (low-index-contrast, less than about 1% or 2%, for example). In other words, core layer 511 resembles core 310 of FIGS. 1A–1E, while core layer 512 may be configured to resemble core 410 of FIGS. 2A–2E. Over portions of the waveguide where core layer 511 is present and layer 512 is at least a few tens of microns wide, or where core layer 511 is greater than 1 to 2 µm wide, the presence of core layer 512 may have little or no effect on the optical mode characteristics of the waveguide. Over waveguide segments lacking core layer 511, core layer 512 may support an optical mode with characteristics substantially determined by the index contrast and dimensions of core 512 (typically less than about 10 µm in width) in order to provide lateral guiding of a supported optical mode). As the size of core 511 decreases below about 1 to 2 microns in width until it is no longer present, an optical mode supported by the waveguide undergoes a continuous evolution between these two extremes, and various desired mode sizes, shapes, or other characteristics may be achieved by appropriate combinations of dimensions for the cores 511 and 512. Lateral portions of cladding 520 may be configured in any of the various ways described hereinabove, and the waveguide may be formed to include multiple segments having various of these configurations.

The two-core structure of the waveguide of FIGS. 5A–5E enables a wide array of optical designs for achieving various optical performance and/or functionality. The high-index-contrast core layer 511 may be readily adapted for substantially spatial-mode-matched optical end coupling with another optical waveguide or semiconductor optical device, or for optical transverse-coupling with another optical waveguide (substantially adiabatic, substantially modal-index-matched, or otherwise), or for other purposes. The low-index-contrast core layer 512 may be readily adapted for substantially spatial-mode-matched optical end-coupling with another optical waveguide or with an optical fiber, or for enabling insertion of various free-space optical components between the ends of two such optical waveguides, or for other purposes. Such adaptations of core 512 may include the presence of core 511 at a reduced width (less than about 1 µm wide, for example) to achieve the desired mode characteristics. Substantially adiabatic transitions may be made between these various waveguide types (high-index-contrast and low-index-contrast) by spatially selective patterning of layers 511 and 512.

Figure 6A:
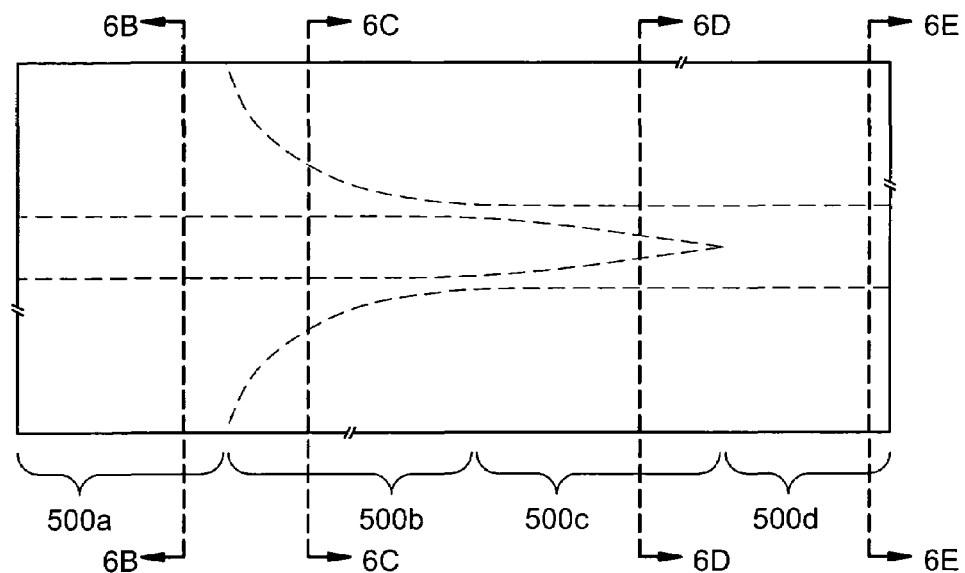
FIGS. 6A–6E are plan and cross-sectional views of an exemplary low-profile-dual-core optical waveguide.
Figure 6B:
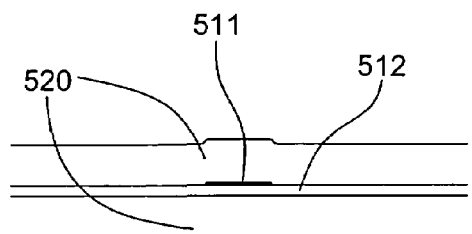
Figure 6C:
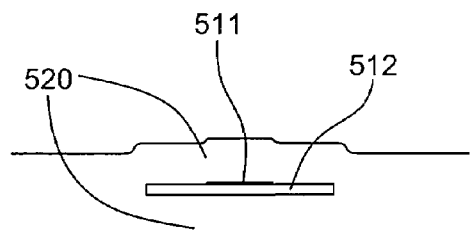
Figure 6D:
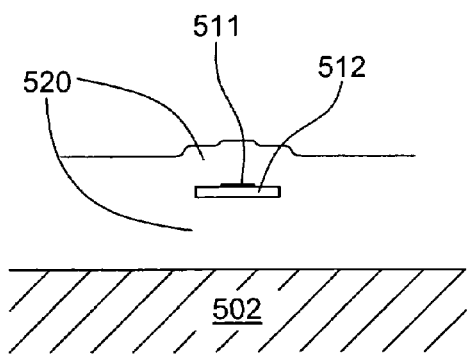
Figure 6E:
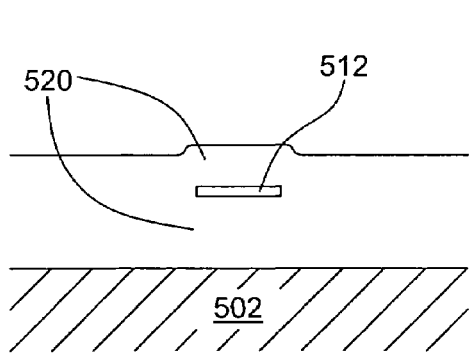
Figure 7A:
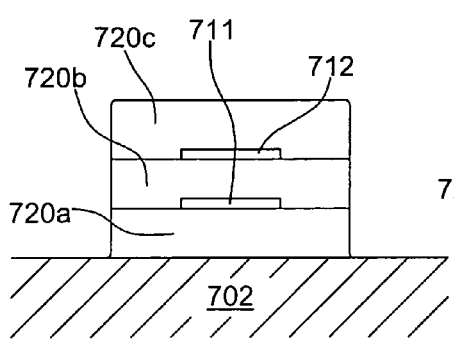
FIGS. 7A–7E are cross-sectional views of exemplary low-profile-dual-core optical waveguides.
Figure 7B:
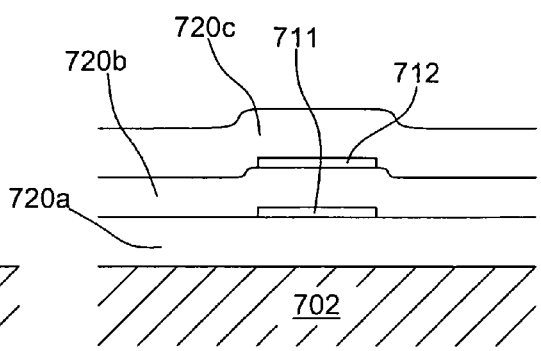
Figure 7C:
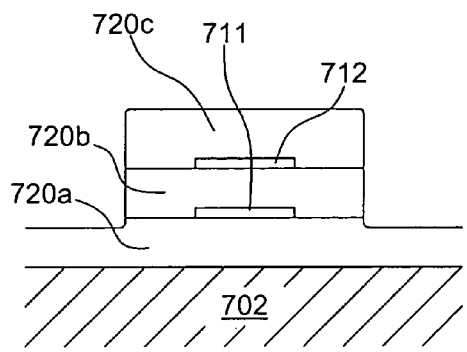
Figure 7D:
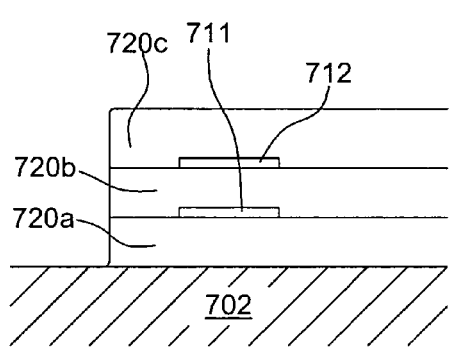
Figure 7E:
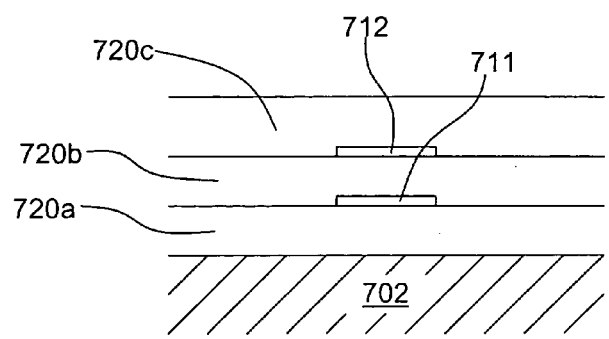

As shown in FIGS. 6A–6E, a high-index-contrast waveguide core 511 a few microns wide may be patterned atop a substantially uniform core layer 512 over a first segment 500a of a waveguide. Along this first waveguide segment 500a, the core 511 substantially determines the characteristics of a guided optical mode, while layer 512 has negligible influence on the properties of the waveguide (FIG. 6B). Along a second waveguide segment 500b, both core layers 511 and 512 may be patterned. Layer 511 may be patterned to continue the presence of the high-index-contrast core, while layer 512 may be patterned to form a low-index-contrast core (FIG. 6C). The patterning of layer 512 may be such that the low-index-contrast core appears gradually (i.e., substantially adiabatically, as shown), or the low-index-contrast core may appear abruptly (not shown). Core 511 continues to substantially determine the optical characteristics of waveguide 500 along segment 500b. Along a third segment 500c of waveguide 500 (FIG. 6D), core 511 is patterned so as to gradually decrease in width along the length of the waveguide until it finally terminates, while core 512 continues to be present along the length of segment 500c. This tapering of core 511 is sufficiently gradual so as to allow a substantially adiabatic transition between a waveguide optical mode characteristic of high-index-contrast core 511 at one end of segment 500c to a waveguide optical mode characteristic of low-index-contrast core 512 at the other end of segment 500c. A fourth segment 500d of waveguide 500 includes only core 512, without core 511 (FIG. 6E). The exemplary optical waveguide 500 as shown in FIGS. 6A–6E may therefore serve as an optical mode converter, with optical power propagating in either direction. Instead of terminating, core 511 may taper to some minimum width (less than about 1 μm, for example; not shown) and then remain at that width along segment 500d, in order to achieve desired characteristics for an optical mode supported by segment 500d.

In variants of the embodiments of FIGS. 5A–5E and 6A–6E, cores 511 and 512 may be vertically separated by cladding material. Adjustment of this separation allows control of an optical transverse-coupling constant between the cores, for example, or adjustment of the depth of the cores within the cladding 520. In other variants of such embodiments, cores 511 and 512 may appear and/or terminate abruptly instead of gradually. Such an arrangement may be appropriate for substantially modal-index-matched optical transverse-coupling between the cores, instead of the substantially adiabatic transverse-coupling described hereinabove. Many other variants of these embodiments may be contemplated within the scope of the present disclosure.

Exemplary embodiments of a dual-core planar waveguide are shown in cross-section in FIGS. 7A–7E positioned on a waveguide substrate 702. Substrate 702 may comprise a semiconductor substrate such as silicon in this example, although any suitable substrate material may be employed. In this example the waveguide includes two doped silica cores 711 and 712 between lower-index upper cladding 720c and lower cladding 720a, which may comprise doped or undoped silica, with refractive indices typically falling in a range between about 1.44 and about 1.46. The index contrast is typically between about 1% and about 2%, for example (core indices typically between about 1.46 and about 1.48; low-index-contrast). The dual-core waveguide includes a spacer layer 720b between the cores 711 and 712 (also may be referred to a middle cladding layer). The spacer or middle cladding 720b may comprise the same material as cladding layers 720a and 720c (in which case the boundaries between layers 720a/720b/720c may be absent), or may have an index different from the cladding indices (typically less than about 1% index contrast with the cladding; typically in a range between about 1.44 and about 1.46, although indices lower than 1.44 may be employed as well). The cores may be about 0.6 μm thick by about 6 μm wide in this example, yielding a transverse mode size of around 5 μm high by around 5 μm wide (mode sizes expressed as 1/e$^2$ HW power). Such a mode might be well-suited for spatial-mode-matching with an optical fiber mode or another similarly configured planar waveguide, for example, thereby enabling end-coupling with reduced level of diffractive optical loss. Cores 711 and 712 may range from about 0.4 μm thick up to about 0.9 μm thick, and between about 4 μm and about 8 μm wide (usually, but not necessarily, the same width for both cores), with refractive indices typically in a range between about 1.46 and about 1.48. Specific combinations of dimensions will depend on the desired spatial mode characteristics and the particular degree of index contrast employed. In addition to doped and undoped silica, other suitable core and cladding materials may be equivalently employed. As in the previous examples, cladding layer 720a below core 711 may be sufficiently thick so as to reduce or substantially eliminate optical leakage from waveguide the waveguide into substrate 702 (within operationally acceptable limits), or a reflective coating between the cladding and the substrate may be employed (as described hereinabove). Lateral portions of cladding layers 720a/720c and middle cladding layer 720b may be configured in any of the various ways described hereinabove, and the waveguide may be formed to include multiple segments having various of these configurations.

Multiple-core exemplary embodiments of a planar waveguide are shown in FIGS. 8A–8E positioned on waveguide substrate 802. As in the preceding examples, substrate 802 may comprise silicon, although any suitable substrate material may be employed, and lower cladding layer 820a and upper cladding layer 820c comprise doped or undoped silica of suitable thickness above and below the waveguide cores, although any suitable cladding material may be employed. In this example, core layer 813 may comprise a layer of silicon nitride or silicon oxynitride a few tens to a few hundreds of nanometers in thickness, and several microns in width (high-index-contrast). Core layer 813 may extend along the entire waveguide, or may extend along only one or more segments of the waveguide while being absent from other segments. Core layers 811 and 812 may comprise a layer of doped silica about 0.6 μm thick and about 6 μm wide having an index slightly higher than cladding 820a/820c (low-index-contrast, between about 1% and about 2%, for example). The dual-core waveguide includes a spacer layer or middle cladding 820b between the cores 811 and 812. The spacer 820b may comprise the same material as cladding layers 820a and 820c (in which case the boundaries between layers 820a/820b/820c may be absent), or may have an index different from the cladding indices (typically less than about 1% index contrast with the cladding; typically in a range between about 1.44 and about 1.46, although indices lower than 1.44 may be employed as well). Core layer 813 resembles core 310 of FIGS. 1A–1E, while core layers 811/812 may be configured to resemble cores 711/712 of FIGS. 7A–7E. Over portions of the waveguide where core layer 813 is present and layers 811/812 are at least a few tens of microns wide, or where core layer 813 is greater than 1 to 2 μm wide, the presence of core layers 811/812 may have little or no effect on the optical mode characteristics of the waveguide. Over waveguide segments lacking core layer 813, core layers 811/812 may support an optical mode with characteristics substantially determined by the index contrast, dimensions, and relative positions of cores 811/812 (typically less than about 10 μm in width) and the index of layer 820b. As the size of core 813 decreases below about 1 to 2 microns in width until it is no longer present, an optical mode supported by the waveguide undergoes a continuous evolution between these two extremes, and various desired mode sizes, shapes, or other characteristics may be achieved by appropriate combinations of dimensions for the cores 811/812 and 813. Lateral portions of claddings 820a/820c and spacer 820b may be configured in any of the various ways described hereinabove, and the waveguide may be formed to include multiple segments having various of these configurations.

The three-layer structure of the waveguide of FIGS. 8A–8E enables a wide array of optical designs for achieving various optical performance and/or functionality. The high-index-contrast core layer 813 may be readily adapted for substantially spatial-mode-matched optical end coupling with another optical waveguide or semiconductor optical device, or for optical transverse-coupling with another optical waveguide (substantially adiabatic, substantially modal-index-matched, or otherwise), or for other purposes. The low-index-contrast core layers 811/812 may be readily adapted for substantially spatial-mode-matched optical end-coupling with another optical waveguide or with an optical fiber, or for enabling insertion of various free-space optical components between the ends of two such optical waveguides, or for other purposes. Such adaptations of cores 811/812 may include the presence of core 813 at a reduced width (less than about 1 µm wide, for example) to achieve the desired mode characteristics. Substantially adiabatic transitions may be made between these two distinct waveguide types (high-index-contrast core and low-index-contrast dual core) by spatially selective patterning of layers 811, 812, and 813.

Figure 9A:
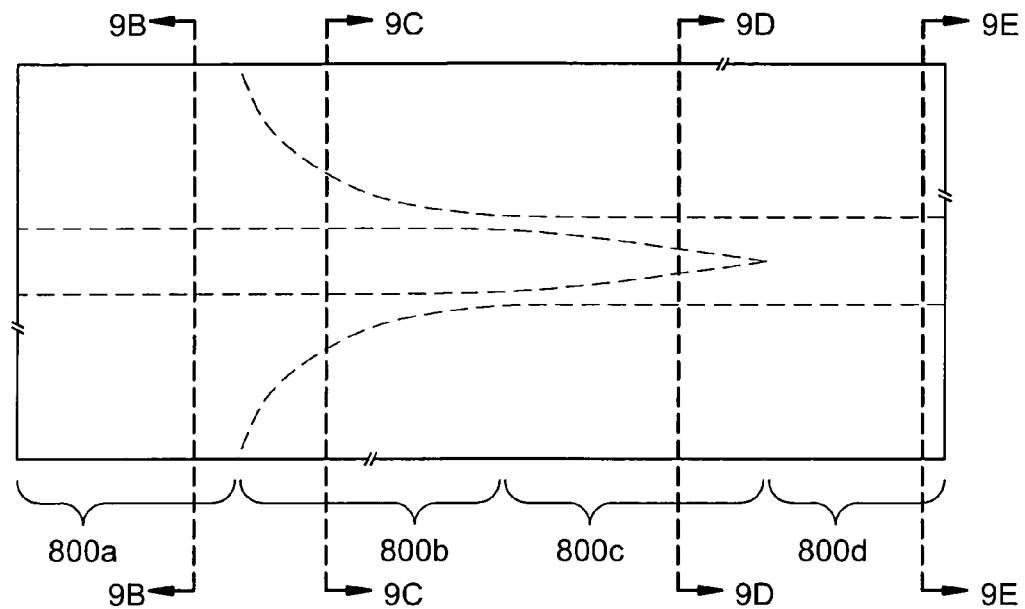
FIGS. 9A–9E are plan and cross-sectional views of an exemplary low-profile-multiple-core optical waveguide.
Figure 9B:
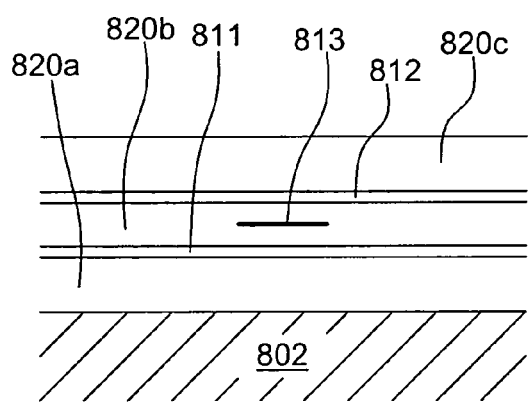
Figure 9C:
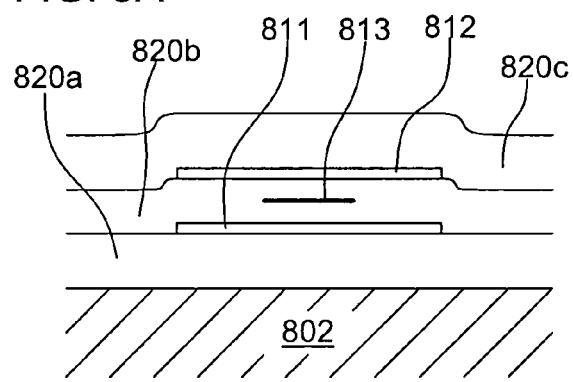
Figure 9D:
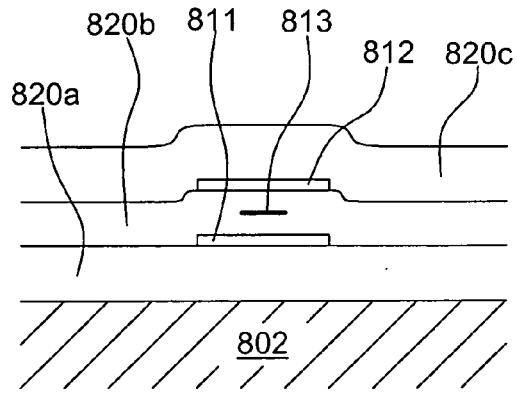
Figure 9E:
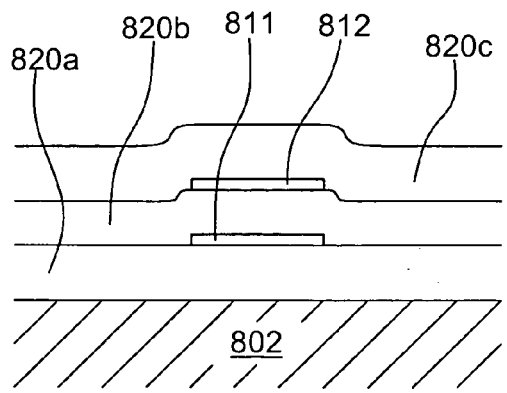

As shown in FIGS. 9A–9E, a high-index-contrast waveguide core 813 a few microns wide may be patterned between substantially uniform low-index-contrast core layers 811/812 over a first segment 800a of a waveguide. Along this first waveguide segment 800a, the core 813 substantially determines the characteristics of a guided optical mode, while layers 811/812 have negligible influence on the properties of the waveguide (FIG. 9B). Along a second waveguide segment 800b, core layers 811/812 as well as core layer 813 may be patterned. Layer 813 may be patterned to continue the presence of the high-index-contrast core, while layers 811/812 may be patterned to form a low-index-contrast dual core (FIG. 9C). The patterning of layers 811/812 may be such that the low-index-contrast cores appears gradually (i.e., substantially adiabatically, as shown), or the low-index-contrast core may appear abruptly (not shown). Core 813 continues to substantially determine the optical characteristics of the waveguide along segment 800b. Along a third segment 800c of the waveguide (FIG. 9D), core 813 is patterned so as to gradually decrease in width along the length of the waveguide until it finally terminates, while cores 811/812 continue to be present along the length of segment 800c. This tapering of core 813 is sufficiently gradual so as to allow a substantially adiabatic transition between a waveguide optical mode characteristic of high-index-contrast core 813 at one end of segment 900c to a waveguide optical mode characteristic of low-index-contrast dual cores 811/812 at the other end of segment 800c. A fourth segment 800d of the waveguide includes only cores 811/812, without core 813 (FIG. 9E). The exemplary optical waveguide shown in FIGS. 9A–9E may therefore serve as an optical mode converter, with optical power propagating in either direction. Instead of terminating, core 813 may taper to some minimum width (less than about 1 µm, for example; not shown) and then remain at that width along segment 800d, in order to achieve desired characteristics for an optical mode supported by segment 800d.

In variants of the embodiments of FIGS. 7A–7E, 8A–8E, and 9A–9E, low-index-contrast cores 811/812 are vertically separated by spacer layer or middle cladding 820b. Adjustment of this spacer index and/or thickness allows adjustment of spatial properties of the propagating optical modes supported by the dual low-index-contrast cores 711/712 or 811/812. The dual low-index core waveguide enables efficient end-coupling with other optical waveguides, including other planar optical waveguides and optical fibers. The transverse dimensions of an optical mode supported by cores 711/712 or 811/812 are typically substantially invariant with wavelength (at least over the range of typical near-infrared telecommunications wavelengths). The lowest order mode supported by the dual low-index-contrast cores may be substantially spatial-mode-matched with another planar waveguide or with an optical fiber. Unlike many single-core waveguides, an optical mode supported by the dual low-index-contrast cores tends to exhibit a minimum phase front curvature upon propagating some distance beyond an end face of the waveguide. Such a minimum phase fronts tend to occur about 5 to 30 µm away from a waveguide end face, for the typical wavelengths and mode sizes discussed herein. This enables substantial reduction in diffractive optical losses upon end coupling with another planar waveguide or with an optical fiber. Dual low-index-contrast cores may be advantageously implemented where free-space optical propagation between waveguides is required, for example according to the teachings of U.S. non-provisional application Ser. No. 10/682,768. Dual low-index-contrast cores may also facilitate substantially spatial-mode-matched end coupling with an optical fiber. Planar waveguides that include dual low-index-contrast cores may also exhibit reduced polarization and/or wavelength dependences relative to single-core planar waveguides. While remaining within the scope of the present disclosure and/or appended claims, the indices, thicknesses, and transverse dimensions of the cores 711/712 or 811/812, as well as the indices of the cladding and the index and thickness of the spacer may all be optimized to achieve desired operationally acceptable performance (with respect to optical loss, polarization dependence, wavelength dependence, spatial mode matching, and so forth).

In variants of the three-core embodiments of FIGS. 8A–8E and 9A–9E, the high-index-core 813 may be positioned within the middle cladding layer 820b (FIGS. 8A–8E, 9A–9E, and 10C), at the interface between the middle cladding layer 820b and either of the cores 811/812 (FIGS. 10B and 10D), at the interface between core 811 and lower cladding 820a (FIG. 10A), at the interface between core 812 and upper cladding 820c, and/or within cladding 820a or 820c (not shown). Positioning of the high-index-contrast core 813 at one of the layer interfaces may reduce the number of fabrication steps (by eliminating the need to deposit the layer surrounding core 813 in two steps). However, placement of core 813 midway between cores 811/812 results in preferential optical coupling into the lowest-order symmetric mode supported by dual cores 811/812. In some operational settings this may be desirable, thereby justifying the additional fabrication steps required for depositing and patterning core 813 and then continuing deposition of middle cladding 820b. Instead of the substantially adiabatic transitions between core 813 and cores 811/812 (FIGS. 9A–9E), in other various embodiments cores 811/812 and 813 may appear and/or terminate abruptly instead of gradually. Such an arrangement may be appropriate for substantially modal-index-matched optical transverse-coupling between the cores, instead of substantially adiabatic transverse-coupling. Many other variants of these embodiments may be contemplated within the scope of the present disclosure.

The dual low-index-contrast low-profile cores of FIGS. 7A–7E, 8A–8E, and 9A–9E may offer the fabrication advantages of low-profile and thin cores (shallower etches, more precise lithography, substantially complete filling between etched features, substantially flat upper surfaces of deposited layers, and so on), while providing desirable optical properties characteristic of thicker cores. For example, if the layers of FIGS. 9A–9E are each deposited and spatially patterned sequentially, then no layer thicker than about 0.6 µm need ever be spatially patterned. The low-profile of patterned core 811, for example, ensures that subsequent deposition of a portion of spacer layer 820b has a substantially flat upper surface for deposition and patterning of core 813, and subsequent deposition of an additional portion of spacer layer 820b over core 813 has a substantially flat upper surface for deposition and patterning of core 812.

Instead of depositing and patterning layers 811/812 separately, layers 811, 820b, and 812 may all be deposited, and then all three layers patterned simultaneously. This would have the advantage of reducing the number of individual steps in the fabrication process, and would guarantee the alignment of cores 811/812, at the expense of requiring a deeper etch step (greater than about 3 μm).

The exemplary low-profile-core waveguides shown in FIGS. 1A–1E, 2A–2E, 3A–3E, 4A–4E, 5A–5E, 6A–6E, 7A–7E, 8A–8E, 9A–9E, and 10A–10E represent only a sampling of various embodiments of planar waveguides that may be formed with one or more low-profile core(s). While exemplary embodiments are shown that include one, two, or three waveguide cores, embodiments including still larger numbers of waveguide cores may be implemented within the scope of the present disclosure. Many other suitable low-profile-core waveguide configurations may be employed, and other suitable materials and/or material combinations used therefor, while remaining within the scope of the present disclosure.

The types of low-profile waveguide cores disclosed herein (width:height aspect ratio greater than about 2:1), and equivalents thereof, exhibit various optical properties that may be useful in various application scenarios. For example, high-index-contrast cores such as that shown in FIGS. 1A–1E may exhibit significant polarization and/or wavelength dependence of their operating characteristics (such as modal index, optical loss, transverse mode size/profile, and so forth). A high-index-contrast low-profile core may be well-suited for applications where such dependences are acceptable or desirable. For example, such cores may be well-suited for substantially spatial-mode-matched optical end coupling with the typically small optical modes of semiconductor optical devices, such as semiconductor lasers or modulators. Such waveguides may also be well-suited for establishing optical transverse-coupling with another waveguide. An optical mode supported by such a core typically extends significantly beyond the core in the vertical direction, and therefore may be readily accessible for establishing optical transverse-coupling. Such waveguides may also be most suitable for applications in which the polarization state of light to be transmitted is known and substantially invariant over time.

A low-index-contrast low-profile core, such as the example of FIGS. 2A–2E, or a low-index-contrast dual core, such as the example of FIGS. 7A–7E, may typically exhibit only negligible polarization and/or wavelength dependence of its optical mode characteristics. Such a waveguide may be well-suited for applications where such dependencies may be undesirable or unacceptable. For example, such a substantially polarization-independent waveguide may be employed in an optical receiver in which the polarization state of incoming light may not be known or may vary over time. Such low-index-contrast low-profile and/or dual cores may typically support larger transverse mode sizes than their high-index-contrast counterparts, and may therefore be more suitable for applications involving free-space optical propagation between adjacent end faces of two waveguides (often through an intervening optical component). The larger mode size characteristic of a low-index-contrast core (single or dual) may suffer less diffractive optical loss upon transmission between the waveguide end faces.

Low-profile cores may offer additional advantages for fabrication and assembly of optical devices. As discussed hereinabove, once the core of a waveguide is formed, additional cladding material is typically deposited to continue the fabrication process. Deposition processes typically employed exhibit varying degrees of conformality, and when cladding material is deposited over a waveguide core so that the upper cladding and core thicknesses are similar (within a factor of two, for example), a curved cladding upper surface typically results. For a waveguide core wherein with an aspect ratio (width:height) of less than about 2:1, a majority of the upper cladding surface directly above the waveguide core is curved. In contrast, under similar circumstances a low-profile core (having an aspect ratio greater than about 2:1) may typically yield an upper cladding surface curved near the lateral edges of the core but substantially flat above a majority of the core. This may provide significant advantages for subsequent fabrication and/or assembly steps employed for constructing a finished optical device, as described further hereinbelow.

The term "optical waveguide" (or equivalently, "waveguide") as employed herein shall denote a structure adapted for supporting one or more optical modes. Such waveguides shall typically provide confinement of a supported optical mode in two transverse dimensions while allowing propagation along a longitudinal dimension. The transverse and longitudinal dimensions/directions shall be defined locally for a curved waveguide; the absolute orientations of the transverse and longitudinal dimensions may therefore vary along the length of a curvilinear waveguide, for example. Examples of optical waveguides may include, without being limited to, various types of optical fiber and various types of planar waveguides. The term "planar optical waveguide" (or equivalently, "planar waveguide") as employed herein shall denote any optical waveguide that is provided on a substantially planar substrate. The longitudinal dimension (i.e., the propagation dimension) shall be considered substantially parallel to the substrate. A transverse dimension substantially parallel to the substrate may be referred to as a lateral or horizontal dimension, while a transverse dimension substantially perpendicular to the substrate may be referred to as a vertical dimension. Examples of such waveguides include ridge waveguides, buried waveguides, semiconductor waveguides (silicon, silicon-based, III-V, others), other high-index waveguides ("high-index" being above about 2.5), silica-based waveguides (silica, doped silica, and/or other silica-based materials), polymer waveguides, other low-index waveguides ("low-index" being below about 2.5), core/clad type waveguides, multi-layer reflector (MLR) waveguides, metal-clad waveguides, air-guided waveguides, vacuum-guided waveguides, photonic crystal-based or photonic bandgap-based waveguides, waveguides incorporating electro-optic (EO) and/or electro-absorptive (EA) materials, waveguides incorporating non-linear-optical (NLO) materials, and myriad other examples not explicitly set forth herein which may nevertheless fall within the scope of the present disclosure and/or appended claims. Many suitable substrate materials may be employed, including semiconductor (silicon, silicon-based, III-V, others), crystalline, silica or silica-based, other glasses, ceramic, metal, and myriad other examples not explicitly set forth herein which may nevertheless fall within the scope of the present disclosure and/or appended claims. For purposes of the foregoing written description and/or the appended claims, "index" may denote the bulk refractive index of a particular material (also referred to herein as a "material index") or may denote an "effective index" $n_{eff}$, related to the propagation constant $\beta$ of a particular optical mode in a particular optical element by $\beta = 2\pi n_{eff}/\lambda$. The effective index may also be referred to herein as a "modal index".

One exemplary type of planar optical waveguide that may be suitable for use with optical components disclosed herein is a so-called PLC waveguide (Planar Lightwave Circuit). Such waveguides typically comprise silica or silica-based waveguides (often ridge or buried waveguides; other waveguide configuration may also be employed) supported on a substantially planar silicon substrate (often with an interposed silica or silica-based optical buffer layer). Sets of one or more such waveguides may be referred to as planar waveguide circuits, optical integrated circuits, or opto-electronic integrated circuits. A PLC substrate with one or more PLC waveguides may be readily adapted for mounting one or more optical sources, lasers, modulators, and/or other optical devices adapted for end-transfer of optical power with a suitably adapted PLC waveguide. A PLC substrate with one or more PLC waveguides may be readily adapted (according to the teachings of U.S. Patent Application Pub. No. 2003/0081902 and/or U.S. provisional App. No. 60/466, 799) for mounting one or more optical sources, lasers, modulators, photodetectors, and/or other optical devices adapted for transverse-transfer of optical power with a suitably adapted PLC waveguide (mode-interference-coupled transverse-transfer or substantially adiabatic transverse-transfer; also referred to as transverse-coupling).

For purposes of the present written description and/or appended claims, "spatially-selective material processing techniques" shall encompass epitaxy, layer growth, lithography, photolithography, evaporative deposition, sputtering, vapor deposition, chemical vapor deposition, beam deposition, beam-assisted deposition, ion beam deposition, ion-beam-assisted deposition, plasma-assisted deposition, wet etching, dry etching, ion etching (including reactive ion etching), ion milling, laser machining, spin deposition, spray-on deposition, electrochemical plating or deposition, electroless plating, photo-resists, UV curing and/or densification, micro-machining using precision saws and/or other mechanical cutting/shaping tools, selective metallization and/or solder deposition, chemical-mechanical polishing for planarizing, any other suitable spatially-selective material processing techniques, combinations thereof, and/or functional equivalents thereof. In particular, it should be noted that any step involving "spatially-selectively providing" or "spatial patterning" a layer or structure may involve either or both of: spatially-selective deposition and/or growth, or substantially uniform deposition and/or growth (over a given area) followed by spatially-selective removal (with or without intervening steps, which may or may not be related to the patterning). Any spatially-selective deposition, removal, or other process may be a so-called direct-write process, or may be a masked process. It should be noted that any "layer" referred to herein may comprise a substantially homogeneous material layer, or may comprise an inhomogeneous set of one or more material sub-layers. Spatially-selective material processing techniques may be implemented on a wafer scale for simultaneous fabrication/processing of multiple structures on a common substrate wafer.

It should be noted that various components, elements, structures, and/or layers "secured to", "connected to", "deposited on", "formed on", or "positioned on" a substrate or layer may make direct contact with the substrate material or layer material, or may make contact with one or more layer(s) and/or other intermediate structure(s) already present on the substrate or layer, and may therefore be indirectly "secured to", etc, the substrate or layer.

The phrase "operationally acceptable" appears herein describing levels of various performance parameters of optical components and/or optical devices, such as optical coupling coefficient (equivalently, optical coupling efficiency), optical throughput, undesirable optical mode coupling, optical loss, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefor vary within a given class of devices depending on such constraints and/or requirements. For example, a lower optical coupling efficiency may be an acceptable trade-off for achieving lower device fabrication costs in some instances, while higher optical coupling may be required in other instances in spite of higher fabrication costs. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs and/or larger device size. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially adiabatic", "substantially spatial-mode-matched", "substantially modal-index-matched", "so as to substantially avoid undesirable optical coupling", and so on as used herein shall be construed in light of this notion of "operationally acceptable" performance.

While particular examples have been disclosed herein employing specific materials and/or material combinations and having particular dimensions and configurations, it should be understood that many materials and/or material combinations may be employed in any of a variety of dimensions and/or configurations while remaining within the scope of inventive concepts disclosed and/or claimed herein. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

What is claimed is:

1. An optical waveguide, comprising:
a substantially planar waveguide substrate;
a lower waveguide core;
an upper waveguide core, at least a portion the upper waveguide core being positioned above and substantially parallel to at least a portion of the lower waveguide core;
lower cladding between the substrate and the lower waveguide core having a refractive index less than refractive indices of the lower and upper waveguide cores; and
upper cladding above the upper waveguide core having a refractive index less than refractive indices of the lower and upper waveguide cores, wherein:
a width of the lower waveguide core is substantially larger than a thickness thereof along at least a portion thereof, and is substantially flat along that portion of the length thereof, thereby yielding a substantially flat surface for forming at least a portion of the upper waveguide core;
the upper and lower waveguide cores are in contact with one another over at least a portion of their respective lengths, and the flat surface comprises a portion of an upper surface of the lower waveguide core;
one of the upper and lower waveguide cores comprises a low-index-contrast core, and the other of the upper and lower waveguide cores comprises a high-index-contrast core;
the high-index-contrast waveguide core tapers in at least one transverse dimension in a longitudinal direction along the flat portion of the lower waveguide core;
the tapered portion of the high-index-contrast core and the portion of the low-index-contrast core in contact with the high-index-contrast core are arranged so as to guide a selected propagating optical mode having a transverse spatial profile that evolves along the length of the tapered portion of the high-index-contrast core;

the high-index-contrast waveguide core tapers sufficiently gradually so as to substantially avoid optical coupling between the selected propagating optical mode and other optical modes;

the high-index-contrast core comprises silicon nitride or silicon oxynitride less than about 200 nm thick and less than about 2 μm wide along a non-tapered portion thereof;

the low-index-contrast core comprises silica or doped silica between about 0.4 μm thick and about 1 μm thick and between about 4 μm wide and about 10 μm wide along at least the flat portion of the lower waveguide; and the upper and lower cladding comprise silica or doped silica.

2. An optical waveguide, comprising:

a substantially planar waveguide substrate;

a lower cladding layer formed on the substrate;

a lower waveguide core formed on the lower cladding layer;

an upper waveguide core formed above the lower cladding layer, at least a portion of the upper waveguide core being positioned above, substantially parallel to, and in contact with at least a portion of the lower waveguide core; and an upper cladding layer formed over the upper waveguide core and the lower waveguide core, wherein:

each of the upper and lower cladding layers has a respective refractive index less than refractive indices of the lower and upper waveguide cores;

the lower waveguide core has, at least along the portion in contact with the upper waveguide core, a substantially flat upper surface;

one of the upper and lower waveguide cores comprises a low-index-contrast core, and the other of the upper and lower waveguide cores comprises a high-index-contrast core;

at least a portion of the high-index-contrast core that is in contact with the low-index-contrast core has a substantially constant vertical transverse extent and has a tapered horizontal transverse extent;

the high-index-contrast core comprises silicon nitride or silicon oxynitride less than about 2 μm wide along a non-tapered portion thereof and less than about 200 nm thick;

the low-index-contrast core comprises silica or doped silica between about 0.4 μm thick and about 1 μm thick and between about 4 μm wide and about 10 μm wide along at least the flat portion of the lower waveguide; and the upper and lower cladding comprise silica or doped silica.

3. A method for forming an optical waveguide, comprising:

forming a lower cladding layer on a waveguide substrate;

forming a lower waveguide core on the lower cladding layer;

forming an upper waveguide core above the lower cladding layer, at least a portion of the upper waveguide core being positioned above, substantially parallel to, and in contact with at least a portion of the lower waveguide core; and forming an upper cladding layer over the upper waveguide core and the lower waveguide core, wherein:

each of the upper and lower cladding layers has a respective refractive index less than refractive indices of the lower and upper waveguide cores;

the lower waveguide core has, at least along the portion in contact with the upper waveguide core, a substantially flat upper surface;

one of the upper and lower waveguide cores comprises a low-index-contrast core, and the other of the upper and lower waveguide cores comprises a high-index-contrast core;

at least a portion of the high-index-contrast core that is in contact with the low-index-contrast core has a substantially constant vertical transverse extent and has a tapered horizontal transverse extent;

the high-index-contrast core comprises silicon nitride or silicon oxynitride less than about 2 μm wide along a non-tapered portion thereof and less than about 200 nm thick;

the low-index-contrast core comprises silica or doped silica between about 0.4 μm thick and about 1 μm thick and between about 4 μm wide and about 10 μm wide along at least the flat portion of the lower waveguide; and the upper and lower cladding comprise silica or doped silica.

* * * * *

UNITED STATES PATENT AND TRADEMARK OFFICE
CERTIFICATE OF CORRECTION

PATENT NO. : 7,184,643 B2  
APPLICATION NO. : 10/836641  
DATED : February 27, 2007  
INVENTOR(S) : Blauvelt et al.

It is certified that error appears in the above-identified patent and that said Letters Patent is hereby corrected as shown below:

On the Title Page

(56) U.S. Patent Documents  6,870,992...

Delete "Hunziker et al.",  
Insert --Grosjean et al.--

(57) Abstract, line 5

After "least a portion",  
Insert -- of --

In the Claims

Column 14, line 37, Claim 1

After "least a portion",  
Insert --of--

Signed and Sealed this

Seventh Day of August, 2007

JON W. DUDAS  
*Director of the United States Patent and Trademark Office*